United States Patent [19]
Mirtain

[11] 3,982,579
[45] Sept. 28, 1976

[54] PNEUMATIC TIRE

[75] Inventor: Henri J. Mirtain, Compiegne, France

[73] Assignee: Uniroyal S.A., France

[22] Filed: July 18, 1974

[21] Appl. No.: 489,686

[30] Foreign Application Priority Data
July 27, 1973 France .............................. 73.27733

[52] U.S. Cl. .................... 152/361 R; 152/209 WT; 152/209 R; 152/352 R
[51] Int. Cl.[2] ..................... B60C 9/18; B60C 11/04
[58] Field of Search ............... 152/209 R, 354, 352, 152/353 R, 361 R, 209 WT, 353 C, 361 FP

[56] References Cited
UNITED STATES PATENTS

| | | | |
|---|---|---|---|
| 1,189,223 | 7/1916 | Albrecht | 152/353 R |
| 1,315,710 | 9/1919 | Crozier | 152/352 |
| 1,337,660 | 4/1920 | Killen | 152/353 R |
| 3,667,529 | 6/1972 | Mirtain | 152/361 DM |
| 3,799,231 | 3/1974 | Boileau | 152/209 R |
| 3,805,868 | 4/1974 | Tangorra | 152/353 C |
| 3,818,964 | 6/1974 | Maiocchi | 152/209 R |
| 3,831,657 | 8/1974 | Dillenschneider | 152/361 FP |

FOREIGN PATENTS OR APPLICATIONS

| | | | |
|---|---|---|---|
| 1,118,664 | 7/1968 | United Kingdom | 152/209 WT |

Primary Examiner—Drayton E. Hoffman
Attorney, Agent, or Firm—Jay L. Chaskin

[57] ABSTRACT

A pneumatic tire having improved speed, stability and cornering characteristics is disclosed. The tire is formed with an annular, axially extending protuberance or bulge formed in the shoulder region on each side of the tire and also has, between the carcass and tread thereof, a reinforcing breaker or belt whose width is wider than that of the rolling contact surface of the tread with the ground and whose lateral sides correspondingly extend into the axially extending protuberances. The radially external surface of the tread and the axially outward protuberance, as viewed when the tire is mounted on a vehicle, are connected along an uninterrupted, convex profile. The width of the reinforcing breaker imparts improved high speed capability and stability to the tire; the uninterrupted profile connection between the radially external surface of the tread and the axially outward protuberance imparts improved cornering performance to the tire; and the axially projecting protuberances provide improved hazard resistance against cuts and penetration of the tire sidewalls.

19 Claims, 3 Drawing Figures

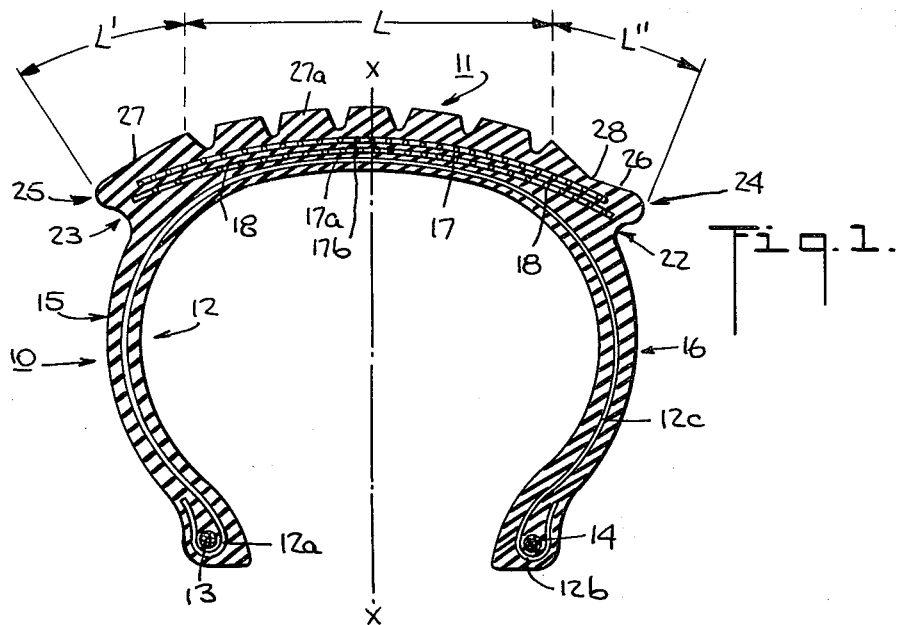
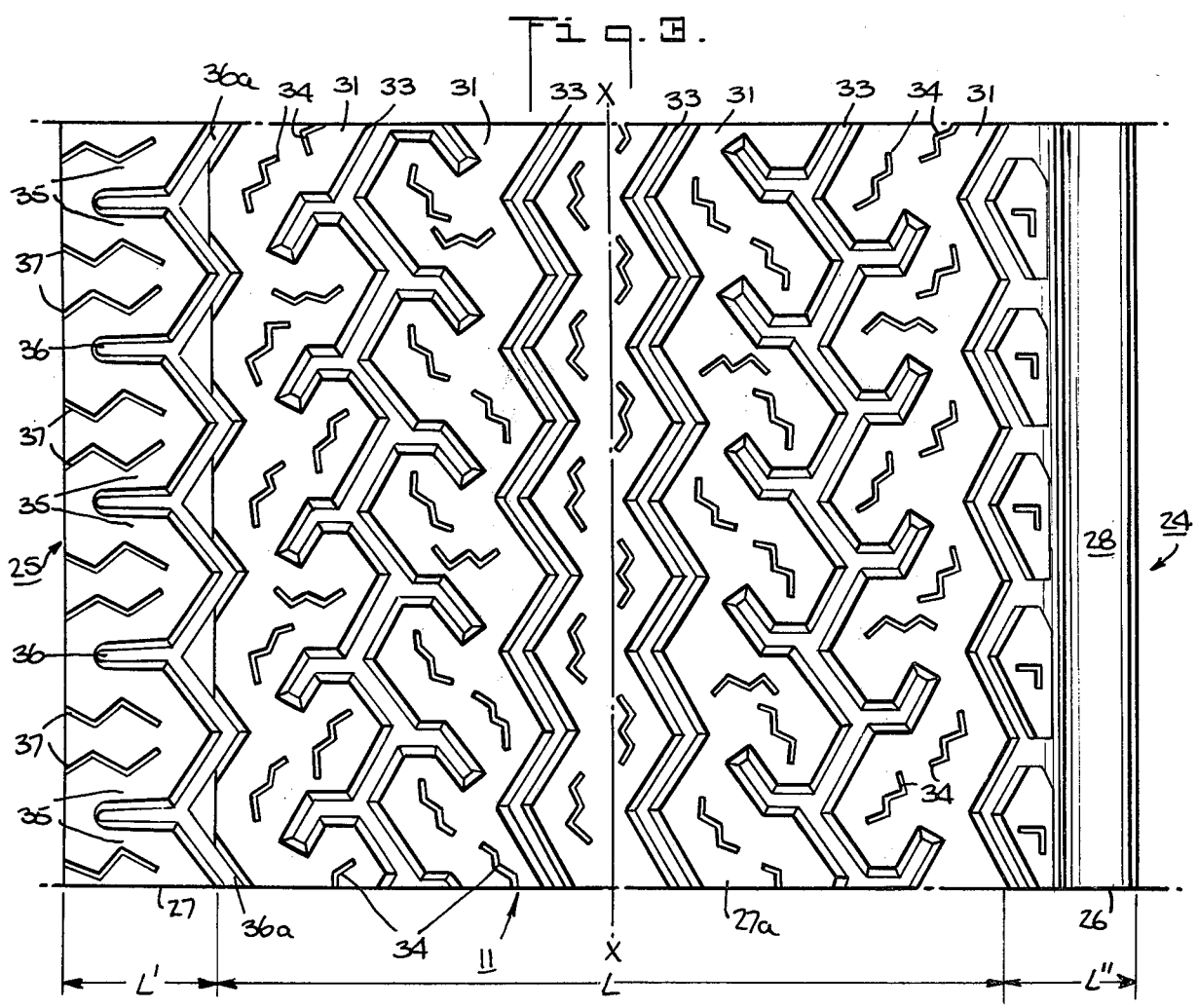

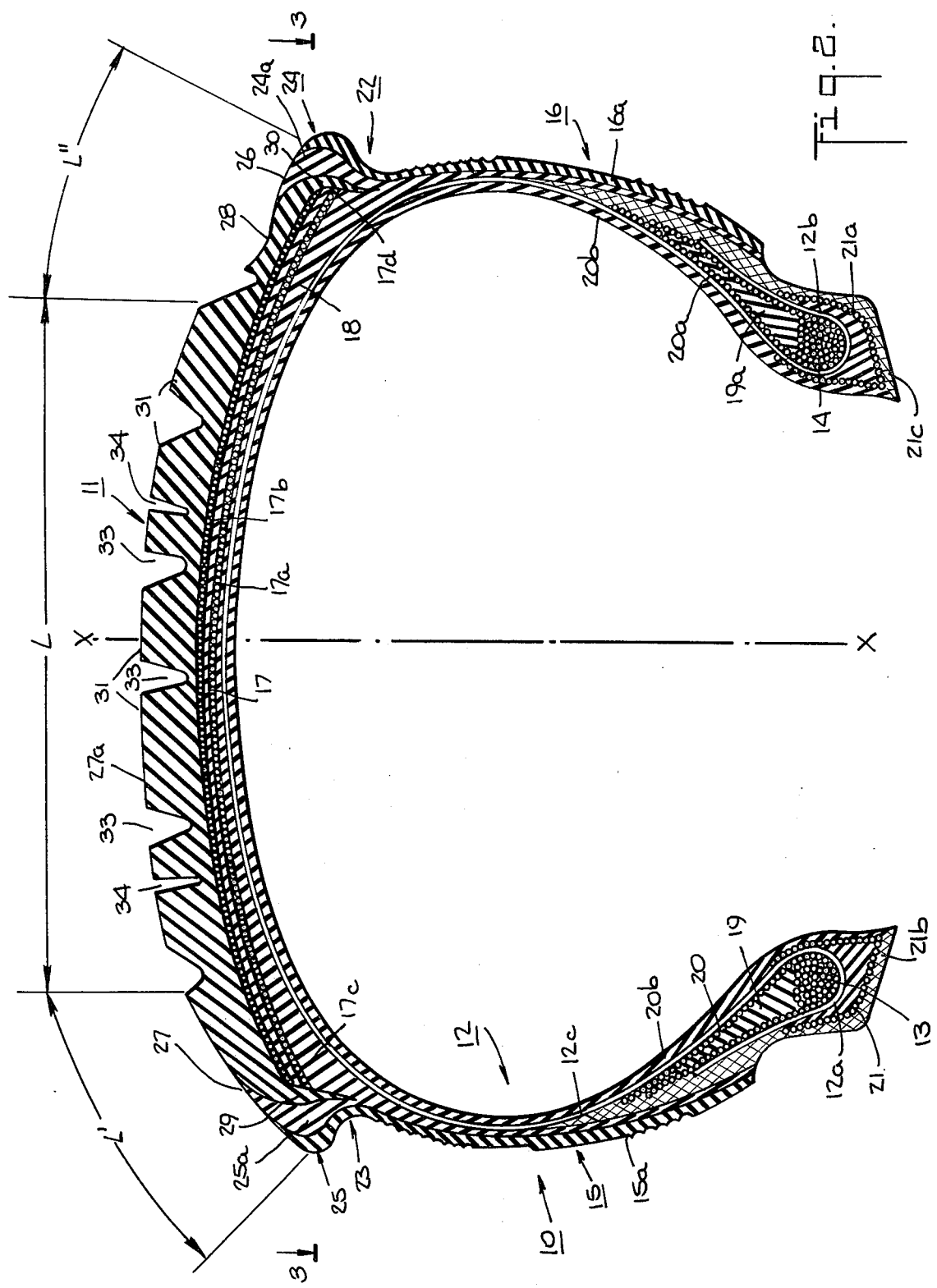

PNEUMATIC TIRE

This invention relates to a pneumatic tire which has an extra wide reinforcing breaker or belt disposed between the tread and carcass of the tire in the crown region thereof, an annular, protuberance or bulge extending axially from the shoulder area on each side thereof, the axially outward protuberance, as viewed when the tire is mounted on a vehicle, serving as a ground engaging extension of the tread during turning and cornering to thereby impart improved performance and stability characteristics to the tire.

BACKGROUND OF THE INVENTION

Heretofore, pneumatic tires, including those of the radial type, have been provided with annular protuberances or bulges extending axially from the sides of the tires.

For example, it is known to provide a pneumatic aircraft tire having annular, axial protuberances on each side thereof beginning at the shoulder areas of the tire and extending partially downward radially along its sidewalls to be normally in contact with a wheel rim so that, upon defection of the tire during landing of the aircraft, the protuberance and rim help to absorb the shock of the impact, as is disclosed in U.S. Pat. No. 2,477,754. This tire is also provided with a reinforcing breaker whose lateral side edges extend into the axial protuberances.

It is also known to provide a tire having either one or two annular, axial protuberances at its shoulder area which extend outwardly beyond the adjacent flexed sidewalls to prevent damage to the sidewalls of the tire due to shock or abrasion caused by obstacles striking the sidewalls, as disclosed in U.S. Pat. No. 3,450,182. Similarly, annular axial protuberances have been employed in the shoulders of pneumatic tires to serve as anchor points for axially oriented tread stiffeners, such as shown in British Pat. No. 973,247, for example.

In general, the annular, axial protuberances in tires disclosed in prior art patents serve as shock absorbers, tread reinforcement anchors, sidewall abrasion protectors or water deflection ribs, rather than as integral parts of the tire which dynamically cooperate with the remaining tire parts to improve overall tire performance. Thus, none of these prior art tires are designed for enhancing the stability and gripping characteristics of the tire at high speeds, during cornering and turning and when subjected to sudden stops and braking action under both dry and wet conditions.

THE INVENTION

These desired performance characteristics and properties under both wet and dry conditions have now been achieved by the pneumatic tire of this invention.

In general, the pneumatic tire of this invention, which is preferably a belted radial-type tire, but may also be a belted bias type or any belted type of tire having a tread thereon, comprises a carcass having a tread overlying the crown region of the carcass; inner and outer (as viewed when the tire is mounted on a vehicle) axially projecting annular bulges or protuberances at the shoulder area of the tire, and, a reinforcing breaker or belt between the thread and the carcass disposed so that the radius of its cross-sectional arc of curvature is greater than the radius of the cross-sectional arc of curvature, collectively, of the tread and the inner and outer bulges. The term "cross-sectional arc of curvature", as used herein, refers to that arc of a circle which, relative to the outer surface of the thread and bulges or to the breaker, contacts at least one of the side edges thereof and comes closest to being tangent to such surface. In a preferred embodiment of this invention, the lateral side edges of the reinforcing breaker extend into and terminate adjacent to the outer edges of the bulges. Also, the axial extremities of the bulges extend axially beyond the inner and outer sidewalls of the tire, and the radial external surface of the outer bulge and the radial external surface of the tread collectively form an uninterrupted convex profile, while the radial external surface of the inner bulge and that of the tread collectively form a concavo-convex, or interrupted, concave (i.e., indented or recessed), profile. In addition, the external surfaces of the tread and outer bulge have novel tread designs and configurations which impart further improved stability and gripping properties to the tire.

As used throughout this application and as commonly understood by those skilled in the pneumatic tire art, the expressions "radial tires" and "radial ply tires" are inclusive of various tire constructions which typically comprise a carcass or body having one or more reinforcement plies of cord fabric extending from bead to bead wherein the cords in each ply are oriented substantially radially, that is, the cords are oriented substantially normal to the beads and the crown centerline of the tire. In single ply radial tire constructions, the carcass cords are usually disposed at an angle of substantially 90°; that is, they extend perpendicular to the plane of the beads in the unshaped carcass. In two-ply radial tire constructions, the cords in each carcass or body ply are usually oriented, with respect to the plane of the beads, at small, oppositely disposed angles of up to about 10°. In these instances, the respective body plies will have oppositely disposed bias angles greater than about 80° but less than 90°. Similar, opposed orientation of the cords in carcass or body piles is also generally used in radial tires having four or more plies.

In addition, radial tires also generally contain a tread reinforcement component usually comprising a breaker or belt disposed between the tread and the carcass in the crown region of the tire. Typically, these breakers or belts are constructed of one or more plies of rubberized and usually weftless cord fabric, the cords generally being of a non-extensible material such as metallic wires or strands, glass filaments, polyester filaments, and the like, and which can be oriented either parallel to each other; that is, substantially parallel to the plane of the beads and, thus, circumferentially of the tire, and/or at a small bias angle. In single ply breaker constructions, the small bias angle can be 0°, but where the breaker is a multi-ply structure, the small bias angles generally are in the range of about 15°–30° with respect to the median circumferential plane of the tire, and may be oppositely disposed in successive plies.

The novel features and structural details of the pneumatic tire of the invention will become more apparent from the ensuing description when considered together with the accompanying drawings wherein the several views illustrate a preferred embodiment thereof and wherein:

FIG. 1 is an elevational view in section of a pneumatic tire made in accordance with this invention;

FIG. 2 is a view similar to that of FIG. 1 on an enlarged scale to illustrate the structural details of the tire; and, FIG. 3 is a plan view of the tire as it would be seen viewing the tire substantially in the direction of the arrows 3—3 of FIG. 2.

As seen in FIG. 1, the pneumatic tire 10 of the invention generally comprises a tread 11 overlying a carcass 12 composed of one or more plies 12c of rubberized tire cords extending, in the preferred embodiment, substantially radially between a pair of beads 13, 14. The tire 10 includes conventional sidewalls 15, 16 which, with the preferred mounting of the tire on a vehicle, may be termed the outer and inner sidewalls, respectively. An annular reinforcing breaker or belt 17 is disposed beneath the tread 11 in the crown region 18 of carcass 12.

In accordance with a preferred embodiment of the invention, reinforcing breaker 17 is formed from two or more layers or plies 17a, 17b of rubberized fabric, each layer or ply being typically reinforced with a plurality of parallel metal cables or strands which are parallel to the median circumferential plane X—X of the tire or, alternatively, which form an angle of between 15° and 30° with the median circumferential plane X—X of the tire, the angle of the cords in ply 17a being essentially equal to but oppositely directed from the angle of the cords in ply 17b with respect to median circumferential plane X—X in the latter case.

The carcass 12 of tire 10 typically comprises a single web or ply of rubberized fabric constituting a layer of parallel fiber cords or strands forming the warp filaments of the fabric, these fiber cords or strands being preferably constituted by filliform elements of an aramid fiber such as DuPont's Kevlar (formerly called fiber B). These elements are either coated with or embedded in a rubber stock and extend through sidewalls 15, 16 into the crown region 18 of the tire and are disposed generally perpendicular to median circumferential plane X—X.

Beads 13, 14 are typically composed of annular metal cords comprising bundled or braided groups of steel wires which are wrapped with tape and about which the extremities of carcass ply 12c are looped as indicated at 12a and 12b in FIGS. 1 and 2. Positioned radially outwardly of each bead 13, 14 is an annular rubber apex or filler strip 19, 19a of triangular cross-section (FIG. 2). The beads 13, 14 and apex strips 19, 19a are each generally wrapped by a corresponding flipper or bead reinforcement 20, 20a. The composite bead apex strip-flipper constructions have wrapped about them the corresponding marginal portions 12a, 12b of carcass ply 12c. The internal surface of the tire is provided with a liner 20b of calendered rubber and the outer surfaces of sidewalls 15 and 16 are provided with veneer layers 15a and 16a, respectively, of calendered rubber. The inner liner 20b may be a conventional butyl liner to provide a tubeless capability to the tire, while the veneer layers 15a and 16a may comprise conventional high ozone and flex resistant rubbers, such as blends of EPDM and natural rubber or SBR rubber. The bead sections of the carcass are externally covered by annular rubber rim cushions 21, 21a (FIG. 2) which are generally of very hard rubber and extend inwardly into proximity with the inner edges of the bead. The inner edges of rim cushions 21, 21a cover corresponding chafer strips 21b, 21c and the rim cushions 21, 21a and chafer strips 21b, 21c serve to protect the bead portions of the tire against wear when the tire is mounted on a wheel rim. The radially outer portions of rim cushions 21, 21a are covered by the veneer layers 15a, 16a and the rubber layers in sidewalls 15, 16.

As shown in FIG. 2, the tread portion 11 of tire 10 comprises a central zone of a width L which denotes the external peripheral surface area of tread 11 that is generally in contact with the ground during rotation of the tire along a rectilinear path. The extent of tread width L is indicated by the broken lines at the ends of the arrowed line identifying the tread width L. At the shoulders 22, 23 and extending or projecting axially from each side of tread width L is an annular, axially directed bulge or protuberance 24, 25. Bulge 24 is intended to be on the axially inner side of tire 10 when the tire is mounted on a vehicle, while bulge 25 is intended to be on the axially outer side of such tire 10. The axially outward extremity of each bulge 24, 25 projects slightly beyond the tangential plane of outer and inner side walls 15 and 16, respectively, to provide protection against sidewall abrasion as well as improved ride characteristics. The radially external surface 27 of bulge 25 and the radially external surface 27a of tread 11 are connected along an uninterrupted convex profile so as to be in curvilinear alignment with tread 11 when tire 10 is at rest rolling under normal load along a rectilinear path, the width of the radially external surface 27 being indicated by the arrowed line L'. Similarly, the width of the radial external surface 26 of bulge 24 is indicted by arrowed line L''. However, the radially outer surface 26 of bulge 24 extends from tread 11 along a concavo-convex profile, or interrupted concave profile containing a recessed or indented portion 28 therein intermediate the ends of width L''. This asymmetric configuration of the tire with respect to the median circumferential plane X—X makes it possible to achieve a savings of material and weight reduction of the tire. Moreover, the radially external peripheral surface 27 of bulge 25 imparts a greater degree of stability to a vehicle during turning and cornering when this surface comes into contact with the ground to supplement the contact surface 27a of tread 11. Also, during severe braking, and particularly in the case of the front tires of a vehicle provided with tires made in accordance with this invention, the increased load on the tire causes greater deflection of the tread relative to the sidewalls. As a result of this, radially external surfaces 26 and 27 both come into frictional contact with the ground to assist central tread surface 27a in braking the vehicle.

In FIG. 2, the width of reinforcing breaker 17 is shown to be substantially greater than tread width L, with the lateral side edges 17c, 17d of reinforcing breaker 17 extending into and embedded in annular bulges 25, 24 respectively. Reinforcing breaker 17 is interdisposed between tread 11 and carcass 12 in crown region 18 so that the radius of its cross-sectional arc of curvature is greater than that of either the external surface of tread width L or annular bulge surfaces 26 and 27. This arrangement allows the additional contact surfaces 27 and 28 to be both smoothly and effectively added to that of central surface 27a in response to cornering and braking situations that are severe enough to require tread contact surface augmentation. Moreover, the extra width of the breaker 17 insures that there will not be a hinge effect radially inwardly of the points in the shoulder areas where the surfaces 26 and 27 meet the surface 27a, at which locations the ends of a normal width breaker would be positioned. Reinforcing breaker 17 also imparts greater strength and durability to tire 10 and permits the tire to be run at higher speeds while maintaining cooler belt edges. Shown in FIG. 2, the lateral side edges 17c, 17d of reinforcing breaker 17 are preferably covered by the adjoining tapered edges 29, 30 of the thread 11, which edges preferably extend radially inward beyond the points of maximum width of the bulges 25, 24, up to the radially external start of the respective sidewalls 15, 16 of the tire. The bulges 25 and 24 are preferably created by corresponding annular bulges 25a, 24a in the rubber layers 15, 16 of the sidewalls of the tire where such layers extend into the tire shoulders.

The configurations of the radially external surfaces 26, 27 and 27a of bulges 24 and 25 and tread 11 are shown in FIG. 3, where it can be seen that tread surface 27a if formed with a plurality of raised, circumferentially continuous, sculptured zig-zag ribs 31 which define a plurality of relatively deep, circumferentially continuous tire grooves 33 therebetween. This rib and groove arrangement provides a continuous rolling foundation and permits only a slow and uniform wear. The ribs 31 are each provided with a plurality of shallow W-shaped sipes or grooves 34 formed therein. The broken contour lines of each sculptured rib 31 provide for excellent gripping of the ground along a rectilinear course as well as along a curvilinear one in a turn on the road, whether under dry or wet conditions.

The radially external surface 26 of the inner buldge 24 is smooth, as shown at 28 in FIG. 3, whereas th radially external surface 27 of outer bulge 25 has a design sculptured thereon in the shape of solid blocks 35 which extend crosswise and are separated from one another by wide, relatively deep, lateral grooves 36 which communicate with a deep, circumferentially extending, zig-zag groove 36a. A plurality of zig-zag, narrow, shallow sipes or grooves 37 extend laterally across each block 35 intermediate the grooves 36. Collectively, blocks 35 and grooves 36, 36a and 37 form a sculptured design on the bulge surface 27 which provides additional support and gripping means for the bulge surface and assists the tread surface 27a in counteracting any tendency of the tire to laterally skid or slip during turning, cornering or upon fast and sudden braking.

As is apparent from the foregoing description, it is intended that the tire of this invention be particularly oriented when mounted on a vehicle so that the annular bulge 25 becomes the outer bulge in each instance and the annular bulge 24 becomes the inner bulge. To facilitate this, the tire may be provided with indicia thereon (not shown) which serves to advise the user as to which side of the tire should be mounted on the outside. This feature is not essential, however, since written mounting instructions can accompany the tire, or the tire may be provided with decorative features (e.g., white side walls) on that side of the tire which includes the outer bulge 25.

Moreover, even if the tire is reversed in mounting so that the inner bulge 24 is mounted on the outside and vice versa, partial benefits of this invention may be achieved in that the bulge surfaces 26 and 27 add to the effective width of the tread at least during severe braking situations.

While particular embodiments of this invention have been shown and described, it will be obvious to those skilled in the art that various changes and modifications may be made without departing from this invention in its broader aspects, and it is, therefore, aimed in the appended claims to cover all such changes and modifications as fall within the true spirit and scope of this invention.

What is claimed is:

1. A pneumatic tire comprising a cord reinforced carcass; a tread overlying the crown region of said carcass; a reinforcing breaker disposed beneath said tread in the crown region of said carcass; and first and second axially directed annular protuberances formed at corresponding first and second shoulders of said tire, one of said protuberances having a radially outer surface which is radially recessed from the profile of the tread, the radius of the cross-sectional arc of curvature of said reinforcing breaker being greater than the radius of the cross-sectional arc of curvature, collectively, of said tread and said first and second protuberances when the tire is in the inflated unloaded condition, and the lateral side edges of said reinforcing breaker extending into and terminating adjacent the outer edges of said protuberances.

2. The tire of claim 1 wherein said reinforcing breaker comprises a plurality of plies of rubberized fabric, each of said plies having a plurality of circumferentially disposed metal strands embedded therein, said strands being arranged generally parallel to the median circumferential plane of the tire.

3. The tire of claim 1 wherein the radially external surface of said first protuberance and the radially external surface of said tread collectively form an uninterrupted convex profile.

4. The tire of claim 1 wherein the radially external surface of said second protuberance and the radially external surface of said tread collectively form a concavo-convex profile.

5. The tire of claim 1 wherein the axial extremities of said first and second protuberances extend axially outward beyond planes tangential to the corresponding sidewalls of said tire.

6. The tire of claim 3 wherein the radially external surface of said second protuberance and radially external surface of said tread collectively form a concavo-convex surface.

7. The tire of claim 6 further including indicia means thereon for identifying the inner and outer or inner or outer sides of the tire to facilitate mounting of said tire on a vehicle.

8. The tire of claim 7 wherein said first protuberance is positioned on the outer side of said tire and said second protuberance is positioned on the inner side of said tire.

9. A pneumatic tire comprising a carcass; a tread overlying the crown region of said carcass; a reinforcing breaker disposed beneath said tread in the crown region of said carcass; and, first and second axially directed annular protuberances formed at corresponding first and second shoulders of said tire, the radially external surface of said first protuberance and the radially external surface of said tread collectively forming a convex profile in cross-section, and the radially external surface of said second protuberance and the radially external surface of said tread collectively forming a concavo-convex profile in cross-section.

10. A tire as described in claim 9 wherein said carcass is reinforced by non-metallic cords, said breaker includes metallic cords therein, and wherein the axial extremities of said first and second protuberances extend axially outward beyond planes tangential to the corresponding sidewalls of said tire.

11. The tire of claim 10 further including indicia means thereon for identifying the inner and outer or inner or outer sides of the tire to facilitate mounting of said tire on a vehicle.

12. The tire of claim 11 wherein said first protuberance is positioned on the outer side of said tire and said second protuberance is positioned on the inner side of said tire.

13. The tire of claim 1 wherein the width of the cross-sectional arc of curvature of the reinforcing breaker between the lateral side edges is greater than the width of the cross-sectional arc of curvature of the tread.

14. The tire of claim 1 wherein under normal load conditions said protuberances are not in contact with the road surface.

15. The tire of claim 1 wherein the tread has a central zone of road contact, the respective lateral side edges of said reinforcing breaker terminate beyond said central zone.

16. The tire of claim 9 wherein under normal load conditions said protuberances are not in contact with the road surface.

17. The tire of claim 9 wherein the tread has a central zone of road contact, the reinforcing breaker having respective lateral side edges which terminate beyond said central zone.

18. The tire of claim 9 wherein the width of the cross-sectional arc of curvature of the reinforcing breaker between lateral edges thereof is greater than the width of the cross-sectional arc of curvature of the tread.

19. The tire of claim 9 wherein the second protuberance has a radially external surface which is radially recessed from the profile of the tread.

* * * * *